Jan. 21, 1964 J. H. MANN ETAL 3,118,599
AUTOMATICALLY REVERSING REVOLUTION COUNTER
Filed June 14, 1962 9 Sheets-Sheet 1

Inventors:
Jabez H. Mann,
Robert W. Herr,
Richard L. Pifer,
Thomas L. Stoner,
by Hood, Gust & Irish
Attorneys.

Jan. 21, 1964 J. H. MANN ETAL 3,118,599
AUTOMATICALLY REVERSING REVOLUTION COUNTER
Filed June 14, 1962 9 Sheets-Sheet 2

Inventors:
Jabez H. Mann,
Robert W. Herr,
Richard L. Pifer,
Thomas L. Stoner,
by Hood, Gust, Irish
Attorneys.

Jan. 21, 1964     J. H. MANN ETAL     3,118,599
AUTOMATICALLY REVERSING REVOLUTION COUNTER
Filed June 14, 1962                                9 Sheets-Sheet 3
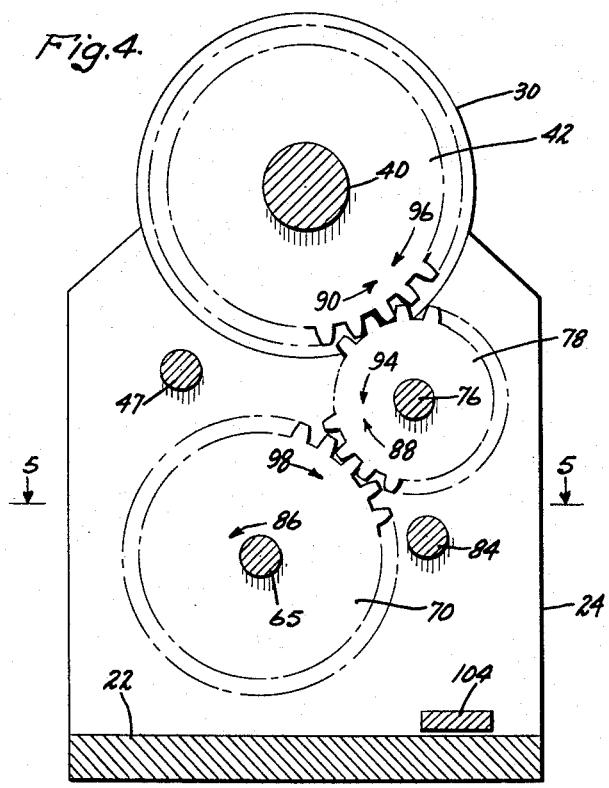
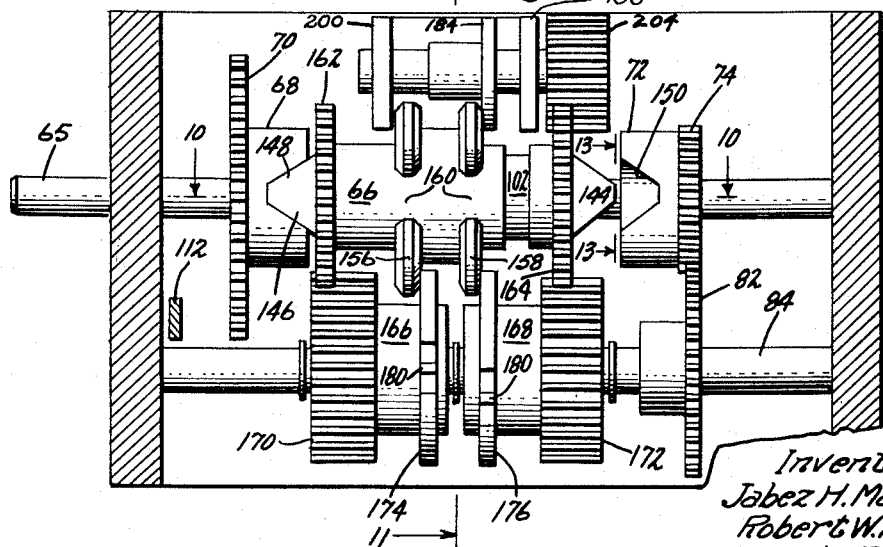
Inventors:
Jabez H. Mann,
Robert W. Herr,
Richard L. Pifer,
Thomas L. Stoner
by Wood, Gust & Irish
Attorneys.

Jan. 21, 1964  J. H. MANN ETAL  3,118,599
AUTOMATICALLY REVERSING REVOLUTION COUNTER
Filed June 14, 1962  9 Sheets-Sheet 5
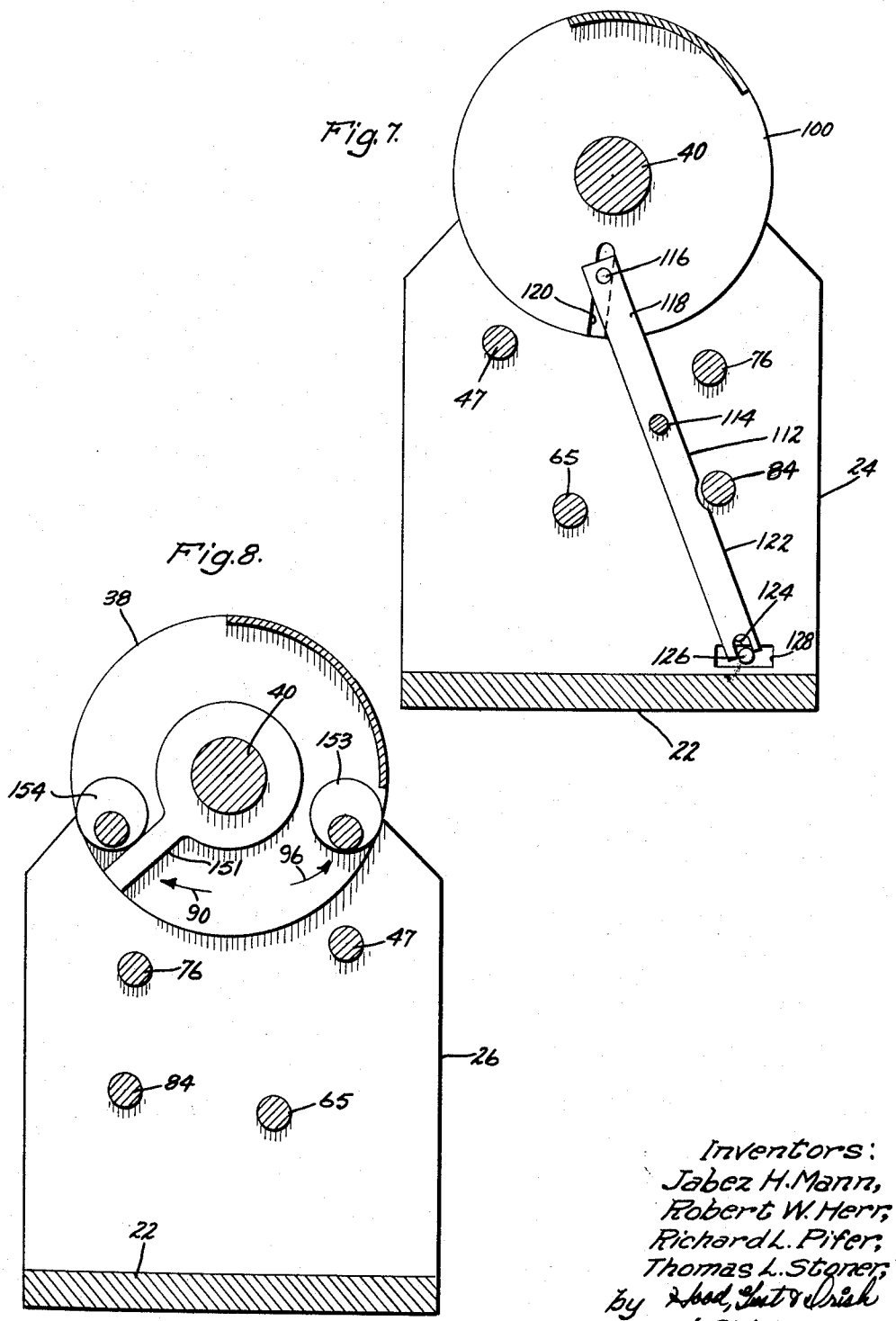
Inventors:
Jabez H. Mann,
Robert W. Herr,
Richard L. Pifer,
Thomas L. Stoner,
by *Wood, Smit & Drish*
Attorneys.

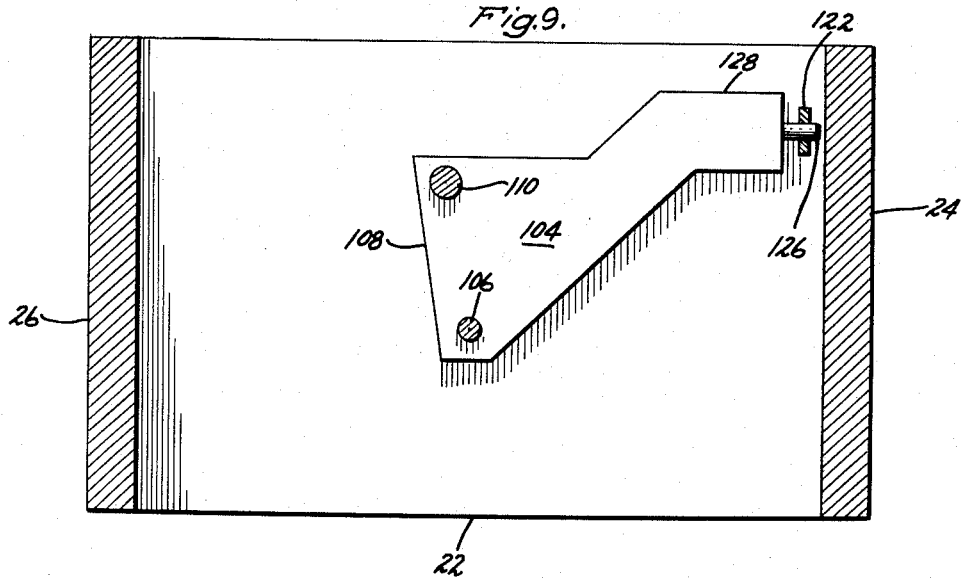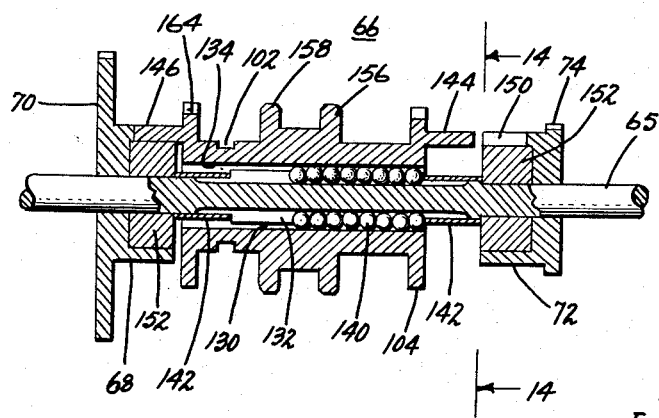

Jan. 21, 1964  J. H. MANN ETAL  3,118,599
AUTOMATICALLY REVERSING REVOLUTION COUNTER
Filed June 14, 1962  9 Sheets-Sheet 7
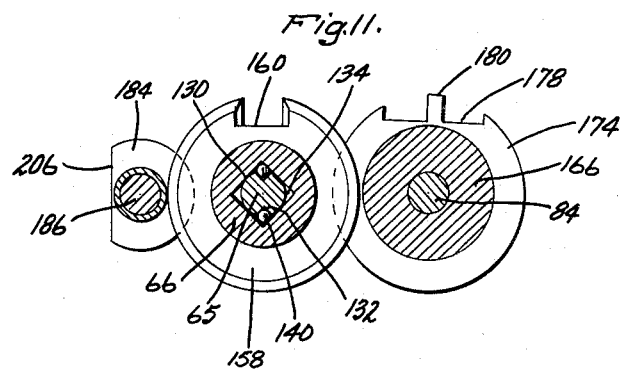
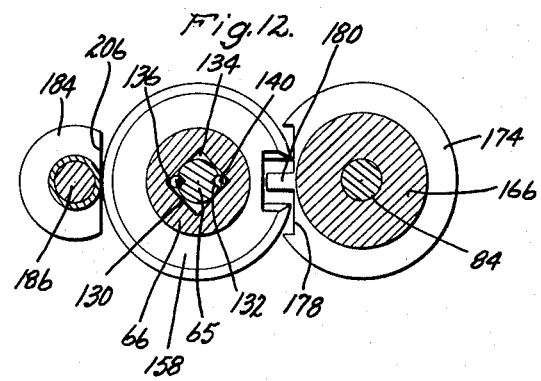
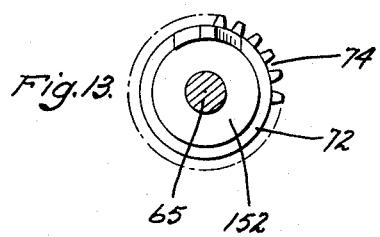
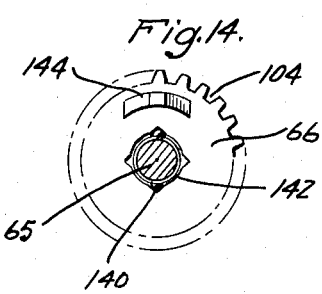
Inventors:
Jabez H. Mann,
Robert W. Herr,
Richard L. Pifer,
Thomas L. Stoner,
by Hood, Gust & Irish
Attorneys.

Jan. 21, 1964  J. H. MANN ETAL  3,118,599
AUTOMATICALLY REVERSING REVOLUTION COUNTER
Filed June 14, 1962  9 Sheets-Sheet 8
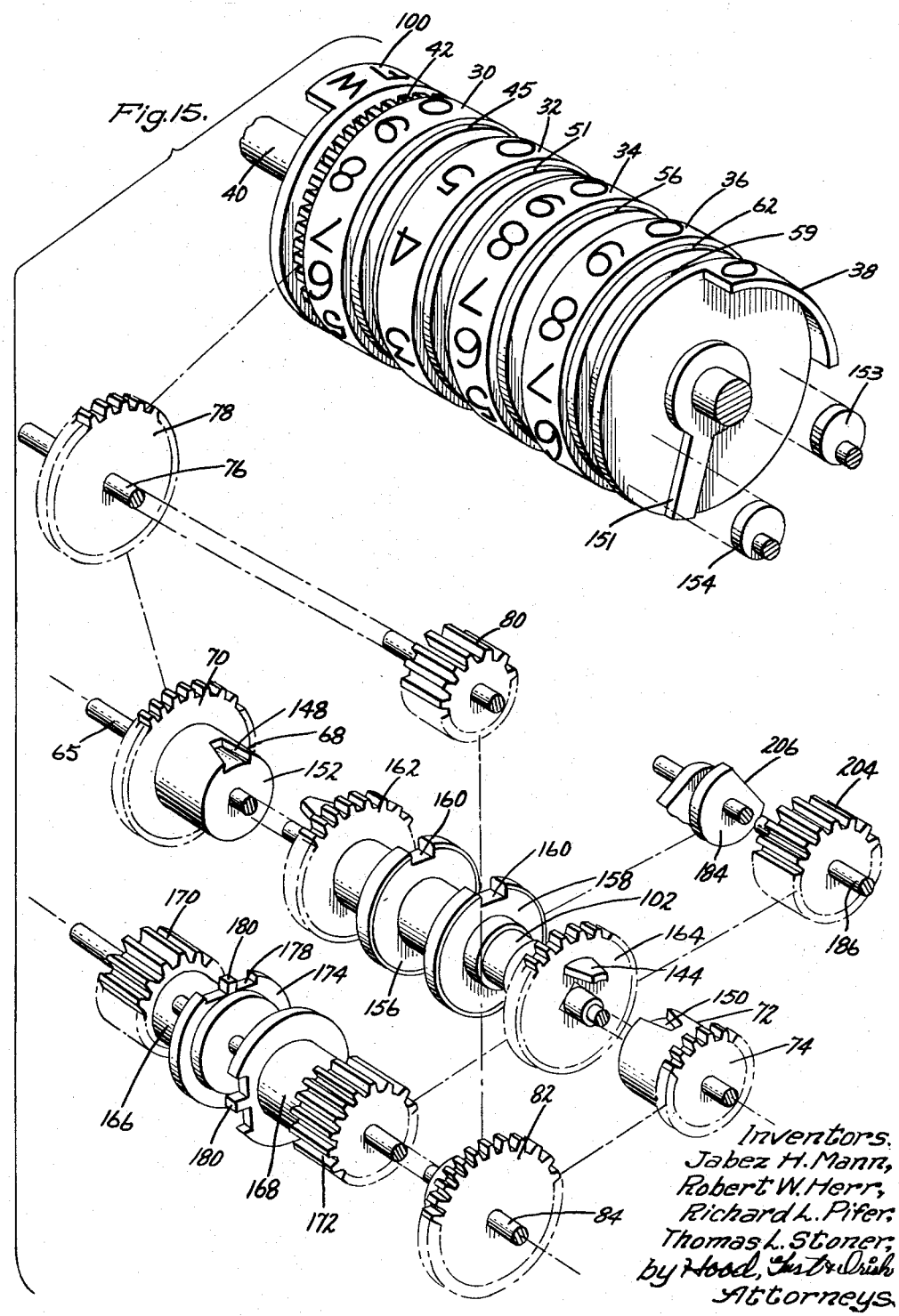
Inventors.
Jabez H. Mann,
Robert W. Herr,
Richard L. Pifer,
Thomas L. Stoner,
by Hood, Gust & Irish
Attorneys.

United States Patent Office 3,118,599
Patented Jan. 21, 1964

3,118,599
AUTOMATICALLY REVERSING REVOLUTION COUNTER
Jabez H. Mann, Acton, Mass., and Robert W. Herr, Richard L. Pifer, and Thomas L. Stoner, Fort Wayne, Ind., assignors to Bowmar Instrument Corporation, Fort Wayne, Ind., a corporation of Indiana
Filed June 14, 1962, Ser. No. 202,577
19 Claims. (Cl. 235—132)

This invention relates generally to revolution counters, and more particularly to a revolution counter which automatically reverses the direction of counting at each extremity of a predetermined count.

Devices for counting the number of revolutions of a shaft conventionally comprise a plurality of number wheels each bearing indicia in the form of digits of a respective order of the maximum number capable of being counted. A shaft rotatably drives the number wheel having the digits of the lowest order thereon and intermittent motion-transferring mechanisms, such as two-tooth gears and cooperating locking cams and mutilated pinions or Geneva wheels and locks, respectively interconnect the number wheels bearing the digits of successively higher orders.

In certain computers employed for navigational purposes, revolution counters are employed for the read-out of such data as longitude, latitude and deviation. In the case of latitude, the read-out provided by the counter must be from zero degrees to 90° north or south, i.e., on either side of the Equator, and in the case of longitude, the read-out must be from zero to 180° east or west, i.e., on either side of the Greenwich meridian. An aircraft or vessel upon which the navigational computer is employed may very well, while traveling on a continuous straight-line course, cross the Equator or the Greenwich meridian, as the case may be, and thus the output shaft of the latitude or longitude portion of the computer will continue to rotate in the same direction despite the fact that the Equaor or Greenwich meridian has been crossed. Thus, the counter, with continuous input shaft rotation in the same direction, must be capable of reversing its count, i.e., counting down from 180°00' to 000°00' as the aircraft or vessel moves from one hemisphere and across the Greenwich meridian into the other hemisphere, and then counting back up from 000°00' toward 180°00' as the aircraft or vessel continues in the same direction through the other hemisphere, it being further desirable that the counter indicate the hemisphere in which the movement is taking place. In the past, revolution counters for indicating latitude, longitude or variation have conventionally incorporated two sets of number wheels, one for each hemisphere with one set of wheels rotating in one direction and the other set in the opposite direction with a shade or mask exposing the digits of one set of wheels in one hemisphere and the digits of the other set of wheels in the other hemisphere. Other similar arrangements have employed two sets of number wheels both rotating in the same direction with one set having digits sequenced from 0 through 9, for example, and the other set having digits sequenced from 9 through 0. Still other arrangements have employed a single set of number wheels but with each number wheel having two sets of oppositely progressing digits thereon. With all of these arrangements, one set of digits will be adding and the other simultaneously subtracting with a given direction of input shaft rotation. Such arrangements have either required duplicate sets of number wheels, transfer mechanisms and gearing, or double width number wheels and have thus required an excessively large amount of space on the computer read-out panel, such space being at a premium particularly on aircraft. It is therefore desirable to provide a revolution counter for indicating latitude, longitude or variation incorporating only a single set of number wheels in which the direction of rotation of the number wheels and thus the direction of counting is automatically reversed at the extremities of a predetermined count, such as 180°00' and 000°00'.

Automatically reversing counters have been proposed where in a gear shift mechanism interconnects the input shaft and the number wheels, and another revolution counter comprising successively higher order transfer mechanisms is provided driven by the input shaft and arranged to actuate the gear shift mechanism thereby to reverse the direction of rotation of the number wheels at the extremities of the desired count. Such arrangements, while reducing the amount of space required on the computer read-out panel, still require duplicate sets of transfer mechanisms and gearing.

Another form of automatically reversing counter has been proposed likewise incorporating gear shift means between the input shaft and the number wheels with the gear shift means being actuated responsive to arresting of the rotation of the highest order number wheel at predetermined positions corresponding to the extremities of the desired count. To the best of the applicants' knowledge however, such prior mechanisms of this type have had the disadvantage of losing the count with continuous input shaft rotation in the same direction, i.e., during each cycle of operation, the count indicated on the number wheels of the counter will fall one or two revolutions behind the actual number of revolutions of the input shaft; in the case of counters for navigational read-out purposes, it is essential that the count displayed on the counter accurately correspond to the number of revolutions of the output shaft from the computer. Further, such prior counters have been subject to inadvertent reversal of the count due to the shock of higher order transfers with high speed operation.

It is therefore an object of the invention to provide an improved automatically reversing revolution counter.

Another object of the invention is to provide an improved automatically reversing revolution counter of the type incorporating only a single set of number wheels, transfer mechanisms and gearing.

A further object of the invention is to provide an improved automatically reversing revolution counter of the type wherein reversal of the counting is provided by arresting rotation of the highest order number wheel.

Yet another object of the invention is to provide an improved automatically reversing revolution counter which does not lose count with continuous input shaft rotation in the same direction and which is not subject to inadvertent reversal of the count with high speed operation.

Further objects and advantages of the invention will become apparent by reference to the following description and the accompanying drawing, and the features of novelty which characterize the invention will be pointed out with particularity in the claims annexed to and forming a part of the specification.

The invention, in its broader aspects, provides an automatically reversing revolution counter having a plurality of successively higher order number wheels with intermittent motion-transferring means respectively interconnecting the wheels. A rotatable input shaft is provided with first and second driven members rotatably mounted thereon in axially spaced-apart relation. A coupling member is mounted on the shaft between the driven members and rotatable with the shaft, the coupling member being axially movable on the shaft between first and second positions. The opposite ends of the coupling member and the respective ends of the first and second driven members respectively have cooperating driving means thereon, the driving means respectively having cooperating cam surfaces thereon. The coupling member in its first position has its driving means at one end thereof cooperatively engaging the driving means of the first driven member thereby normally rotating the same in unison with the shaft, and the coupling member in its second position has the driving means at its other end cooperatively engaging the driving means of the second driven member likewise normally rotating the same in unison with the shaft. Means are provided for respectively coupling the first and second driven members to the lowest order one of the number wheels for rotating the same in one direction when the first driven member is rotated in a given direction by the coupling member and the shaft, and in the opposite direction when the second driven member is rotated in the same given direction by the coupling member and the shaft. Means are provided for arresting further rotational movement of the highest order one of the number wheels at two predetermined angularly spaced positions thereof, thereby arresting further rotational movement in the same direction of all of the number wheels, the coupling means and the driven members. The cam surface of the driving means of the driven member which is engaged by the coupling member at the time of arresting and the respective cam surface of the driving means of the coupling member cooperate to shift the coupling member on the shaft from one position to the other responsive to the arresting of the respective driven member and continued rotation of the coupling member and the input shaft in the same direction thereby reversing the direction of rotation of the lowest order number wheel. The number wheels respectively have digits thereon for presenting a count between predetermined extremities and the objective of the invention to prevent the device from losing count with continuous input shaft rotation in the same direction is accomplished by proportioning the cam surfaces so that the shifting of the coupling member is accomplished within one incremental rotational movement of the input shaft which advances the lowest order number wheel by one digit, and by arrangement of the arresting means so that the shifting of the coupling member is accomplished within one such incremental movement of the input shaft next following rotational positions thereof respectively corresponding to one of the extremities of the count and to one digit less than the other extremity of the count.

In the drawing:

FIG. 4 is a cross-sectional view taken along the line 4—4 of FIG. 1;

FIG. 5 is a cross-sectional view taken along the line 5—5 of FIG. 4;

FIG. 7 is a cross-sectional view taken along the lines 7—7 of FIG. 1;

FIG. 8 is a cross-sectional view taken along the line 8—8 of FIG. 1;

FIG. 9 is a cross-sectional view taken along the line 9—9 of FIG. 1;

FIG. 10 is a fragmentary cross-sectional view taken along the line 10—10 of FIG. 5;

FIG. 11 is a fragmentary cross-sectional view taken along the line 11—11 of FIG. 5;

FIG. 12 is a cross-sectional view similar to FIG. 11, but showing the locking discs in unlocked position;

FIG. 13 is a fragmentary cross-sectional view taken along the line 13—13 of FIG. 5;

FIG. 14 is a fragmentary cross-sectional view taken along the line 14—14 of FIG. 10;

FIG. 15 is a fragmentary exploded perspective view further illustrating the invention, and;

Figure 1:
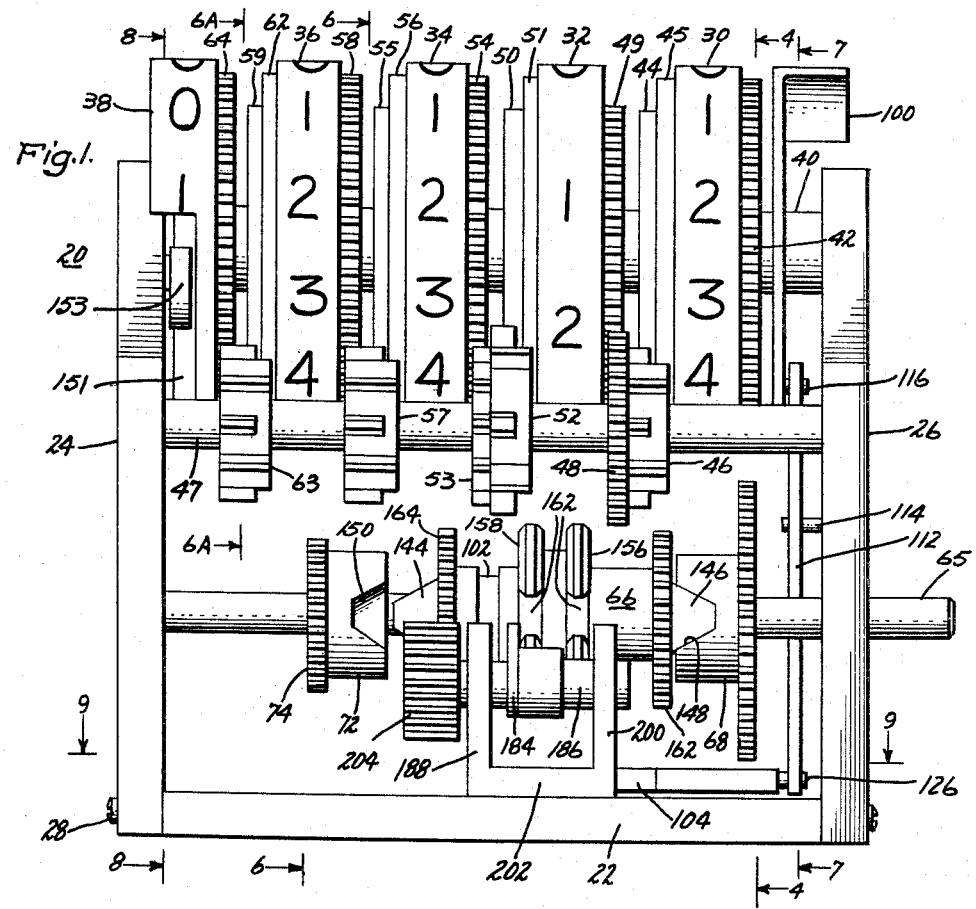
FIG. 1 is an elevational view of one side of a longitude counter incorporating the invention.
Figure 2:
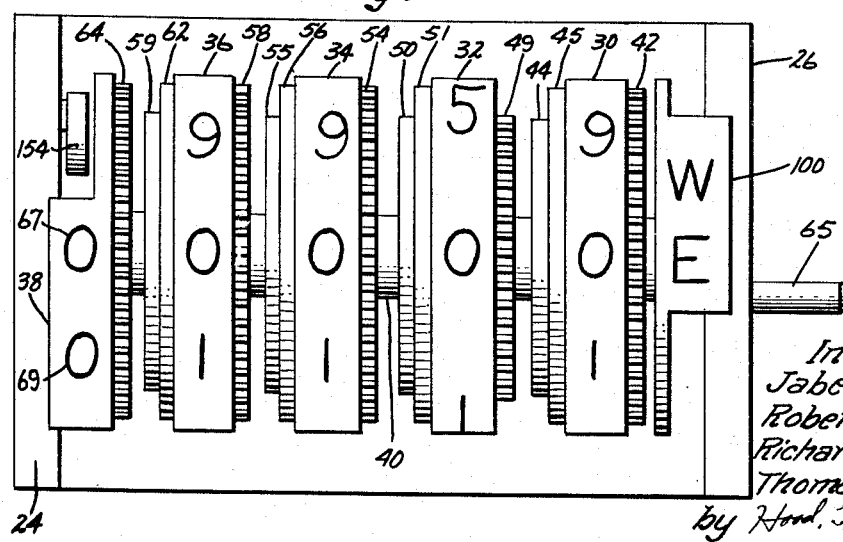
FIG. 2 is a top view of the counter of FIG. 1.
Figure 3:
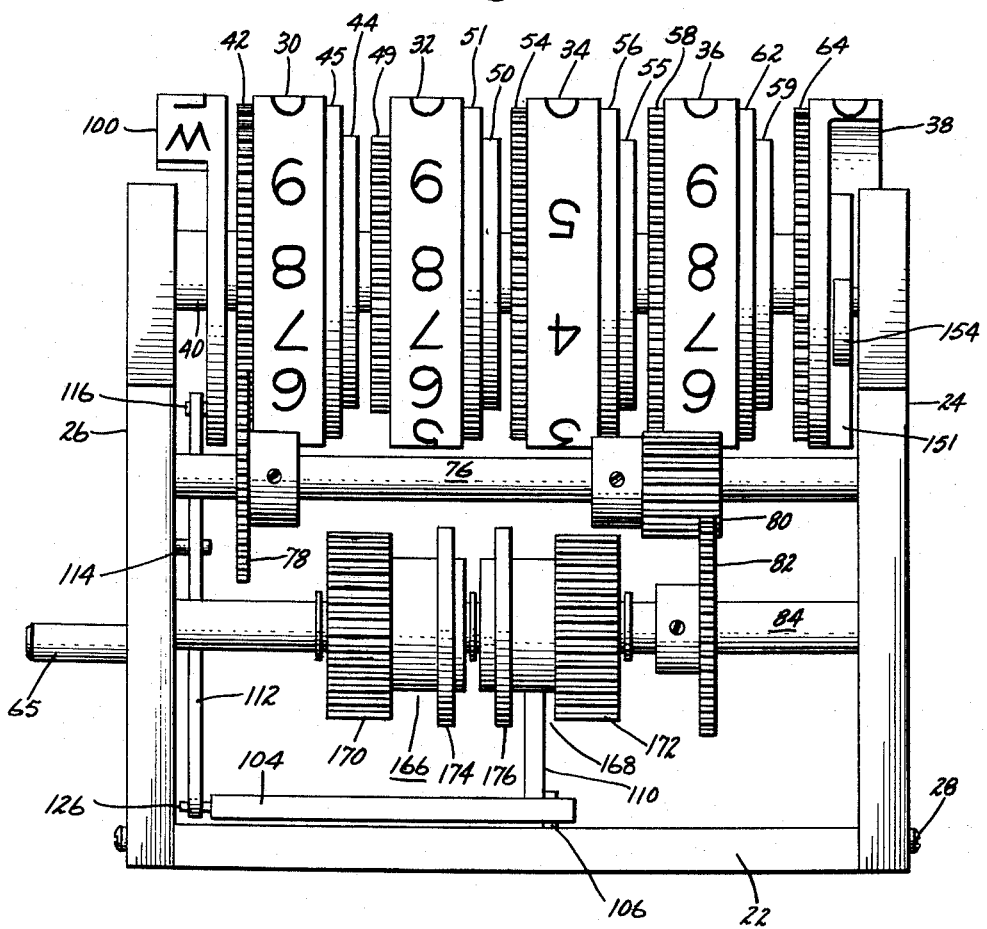
FIG. 3 is an elevational view of the other side of the counter of FIG. 1.

Referring now to the figures of the drawing, a specific embodiment of the invention is shown adapted for use as a longitude counter. The counter mechanism, generally identified at 20, comprises a supporting frame having a base plate 22 with end plates 24 and 26 respectively secured thereto, as by threaded fasteners 28. Five number wheels 30, 32, 34, 36 and 38 are provided respectively independently rotatably mounted on a common shaft 40 which is suitably journaled in the end plates 24, 26. In the illustrated embodiment, number wheels 30, 34 and 36 have digits from zero to 9 thereon at equally spaced intervals, number wheel 32 has digits from 0 to 5 thereon at equally spaced intervals, and number wheel 38 has two "zeros" and one "one" thereon. The lowest order number wheel 30 has an input gear 42 secured thereto and rotatable therewith.

Intermittent motion-transferring mechanisms respectively interconnect number wheels 30 and 32, 32 and 34, 34 and 36, and 36 and 38. In the illustrated embodiment, the transfer mechanism interconnecting number wheels 30 and 32 comprises a two-tooth (out of twenty teeth) gear 44 and complementary locking cam 45 secured to number wheel 30, and eight-tooth mutilated pinion 46 rotatably mounted on pinion shaft 47, a sixteen-tooth gear 48 secured to pinion 46, and a twenty-four tooth gear 49 secured to number wheel 32. With this arrangement, number wheel 32 is advanced one digit, i.e. 60° each full revolution of number wheel 30, the transfer occurring during advance of number wheel 30 from the "nine" to the "zero" presentation, i.e. 36° of rotation of number wheel 30.

The transfer mechanism interconnecting number wheels 32 and 34 comprises a two-tooth (out of twelve teeth) gear 50, a complementary locking cam 51, an eight-tooth mutilated pinion 52 rotatably mounted on pinion shaft 47, an eight-tooth pinion 53 secured to pinion 52, and a twenty-tooth gear 54 secured to number wheel 34. With this arrangement, number wheel 34 is advanced one digit i.e. 36° each full revolution of number wheel 32, the transfer occurring during advance of number wheel 32 from the "five" to the "zero" presentation, i.e. 60° of rotation of number wheel 32.

It will be seen that the two transfer mechanisms above-described in essence provide a step-up between number wheels 30 and 32, i.e. advancing number wheel 32° by 60° in response to a 36° advance of number wheel 30, and a step-down between number wheels 32 and 34, i.e. advancing number wheel 34 by 36° in response to a 60° advance of number wheel 32, the back lash in each transfer being held to a minimum.

Figure 6:
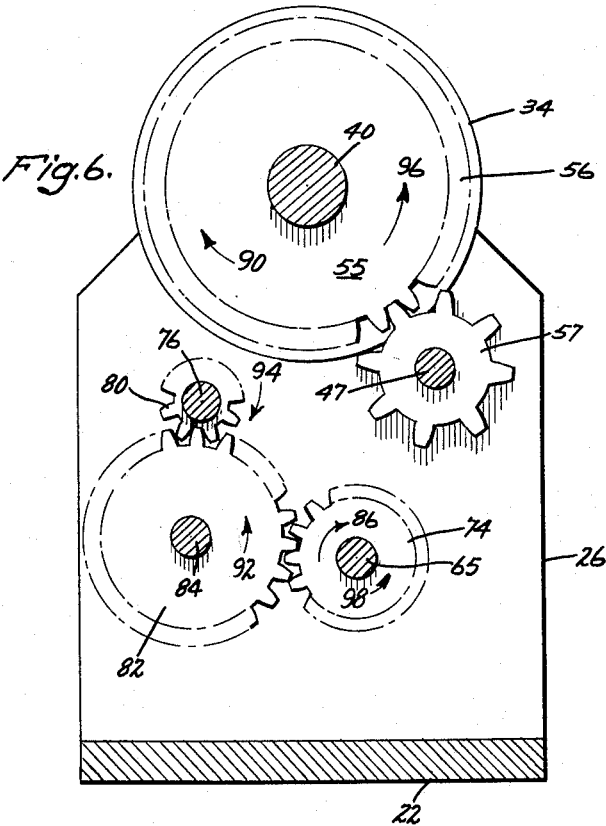
FIG. 6 is a cross-sectional view taken along the line 6—6 of FIG. 1.

The transfer mechanism interconnecting number wheels 34 and 36 (FIG. 6) comprises a two-tooth (out of twenty teeth) gear 55, a complementary locking cam 56, an eight-tooth mutilated pinion 57 rotatably mounted on shaft 47, and a twenty-tooth gear 58 secured to number wheel 36. With this arrangement, number wheel 36 is advanced one digit, i.e. 36° each full revolution of number wheel 34, the transfer occurring during advance of number wheel 34 from the "nine" to the "zero" presentation, i.e. 36° of rotation of number wheel 34.

Figure 6A:
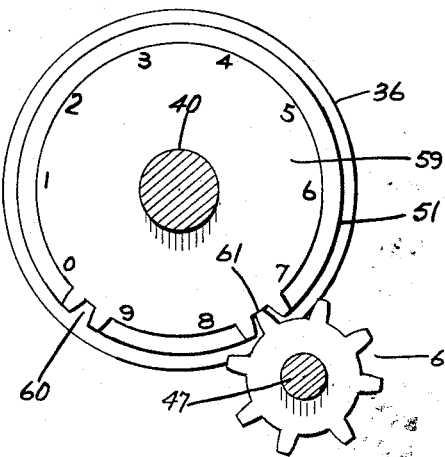
FIG. 6a is a cross-sectional view taken along the line 6a—6a of FIG. 1.

For a purpose to be hereinafter described, the transfer mechanism interconnecting the next-to-highest order number wheel 36 and the highest order number wheel 38 (FIG. 6a) comprises a segmental gear 59 having two angularly spaced two-tooth (out of twenty teeth) segments 60 and 61 and a complementary locking cam 62, segmental gear 59 and locking cam 62 cooperating with eight-tooth mutilated pinion 63. In FIG. 6a, the digits 0 through 9 which appear on the periphery of number wheel 36 are shown properly oriented with respect to the two-tooth segments 60 and 61. With the above described sequencing of digits on the number wheels, when the reading 00000 is displayed the first "zero" 67 on number wheel 38 is displayed. When the number wheels have been advanced to display a reading of 07959, advance of the lowest order number wheel 30 by 36° to display the digit 0 will in turn advance number wheels 36, 34 and 32 respectively to display the digits 800. Advance of number wheel 36 from a position displaying the digit 7 to a position displaying the digit 8 causes the two-tooth segment 61 of segmental gear 59 to advance the number wheel 38 to display the second "zero" 69 so that the reading now is 08000. When the count is advanced to a reading of 09959, advance of the lowest order number wheel 30 to display the digit 0 will again cause advance of number wheels 36, 34 and 32 respectively to display digits 000, the advance of number wheel 36 from a position displaying the digit 9 to a position displaying the digit 0, causing the two-tooth segment 60 of the segmental gear 59 to advance the highest order number wheel 38 to display the digit 1.

An input shaft 65 is provided rotatably journaled in the end plates 24, 26. Input shaft 65 has a shiftable clutch or coupling member 66 secured thereto and rotatable therewith, but axially shiftable thereon between first and second positions, as will be hereinafter more fully described.

A first driven member 68 is rotatably mounted on input shaft 65 on one side of the coupling member 66 and has gear 70 secured thereto and rotatable therewith. A second driven member 72 is rotatably mounted on the input shaft 65 on the other side of the coupling member 66 and has gear 74 secured thereto and rotatable therewith. As best seen in FIG. 15, jack shaft 76 is journaled in the end plates 24, 26, and has gears 78 and 80 respectively secured thereto and rotatable therewith. Gear 78 meshes respectively with gear 70 secured to the driven member 68 and with gear 42 secured to the lowest order number wheel 30. An idler gear 82 is mounted on idler shaft 84 which is journaled in the end plates 24, 26, idler gear 82 meshing respectively with gear 80 on jack shaft 76 and gear 74 secured to the driven member 72. As will be hereinafter more fully described, coupling member 66 is adapted to be shifted axially on input shaft 65 between a first position in which it drivingly engages driven member 68, and a second position in which it drivingly engages the driven member 72.

It will be readily seen that when the coupling member 66 engages the driven member 68, rotation of input shaft 65 in the direction shown by the arrow 86 (FIG. 4) will cause rotation of gear 78 in the direction shown by the arrow 88 and in turn rotation of gear 42 and the lowest order number wheel 30 in the direction shown by the arrow 90. It will further be seen that when coupling member 66 engages driven member 72, rotation of the input shaft 65 in the same direction, i.e., in the direction shown by the arrow 86 (FIG. 6) will cause rotation of idler gear 82 in the direction shown by the arrow 92 and in turn rotation of the gear 80 in the direction shown by the arrow 94. Since gears 78 and 80 are both secured to jack shaft 76 and thus rotate in unison, rotation of gear 80 in the direction shown by the arrow 94 will likewise cause rotation of gear 78 in the same direction (FIG. 4) and will result in rotation of gear 42 and the lowest order number wheel 30 in the direction shown by the arrow 96, i.e., in a direction reverse from the direction shown by the arrow 90.

When the coupling member 66 is in engagement with driven member 72, as above described, rotation of gear 78 in the direction shown by the arrow 94 will result in rotation of gear 70 and driven member 68 in the direction shown by the arrow 98, however, it will be recalled that driven member 68 and gear 70 are rotatably mounted on input shaft 65 and are thus free to rotate under these circumstances in the direction opposite from the direction of rotation 86 of input shaft 65.

A presentation-indicating drum 100 is rotatably mounted on shaft 40 between the lowest order number wheel 30 and the end plate 26, and has indicia indicating "W" (west) and "E" (east) thereon. Driving member 66 has an annular groove 102 formed therein. A lever member 104 is provided pivotally secured to base plate 22 by a suitable pivot pin 106. Arm 108 of lever member 104 has an upwardly extending pin 110 secured thereto which is seated in the annular groove 102 in the coupling member 66. Another lever member 112 is provided pivotally secured to end plate 26 by means of a suitable pivot pin 114. Lever member 112 has a pin 116 secured at its upper end 118 which engages a radial slot 120 formed in the presentation-indicating drum 100. The lower end 122 of lever member 112 has a slot 124 formed therein which engages a pin 126 in the end of arm 128 of the lever member 104. It can now be readily seen that shifting of the coupling member 66 from the position shown in the figures of the drawing in which it is in engagement with driven member 68 axially into its other position in which it is in engagement with the driven member 72 will result in pivotal movement of lever members 104 and 112 thus in turn rotating the presentation-indicating drum 100 from a first position in which the indicia "E" is displayed to a second position in which the indicia "W" is displayed.

Referring now particularly to FIGS. 10 through 13, the coupling member 66 is mounted for rotation with and axial movement on input shaft 65 in the following manner. Shaft 65 has a slightly enlarged portion 130 between driven members 68, 72 and respectively axially spaced therefrom. A pair of diametrically opposite grooves 132 are formed in shaft 65 extending axially across enlarged portion 130 and respectively beyond its ends, as shown. Coupling member 66 has a coaxial center opening 134 initially bored therethrough to a size to accommodate enlarged portion 130 of shaft 65 with a free slip fit. The bored opening is then broached into a generally square configuration to provide corners 136. The coupling member 66 is oriented on the enlarged portion 130 of shaft 65 so that two diagrammatically opposite corners 136 of the opening 134 are respectively in alignment with the grooves 132 thereby to define ball races in which a plurality of balls 140 are seated. It will now be seen that this arrangement provides a linear ball bearing to permit axial shifting of the coupling member 66 from one position to the other with minimum friction, and also provides a driving connection between shaft 65 and the coupling member 66 for rotating the coupling member with the shaft. In order to retain the balls 140 in the ball races defined by the grooves 132 and the corners 136, sleeve members 142 are pressed over opposite ends of the shaft 65 respectively abutting the shoulders defined by the enlarged shaft portion 130.

The opposite ends of coupling member 66 respectively have axially outwardly extending generally V-shaped projections 144 and 146 formed thereon, the projections 144 and 146 being in axial alignment, as shown. Driven members 68 and 72 respectively have complementary generally V-shaped notches 148 and 150 formed therein, as shown. Each of the driven members 68, 72 has a recess formed therein in which a bushing 152 formed of suitable material having lubricating properties, such as bronze is seated.

It will be seen that the projections 144 and 146 on the coupling member 66 respectively provide the driving connections with the driven members 72 and 68, i.e., when the coupling member 66 is in the position shown in the drawings the projection 146 is seated in the notch 148 in driven member 68 and thus rotatably drives driven member 68 and gear 70 in unison with coupling member 66 and shaft 65, and when coupling member 66 is in its other position, projection 144 is seated in notch 150 in driven member 72 and thus rotatably drives driven member 72 and gear 74 in unison with coupling member 66 and shaft 65. As will be hereinafter more fully described, the generally V-shaped projections 144, 146 and the complementary generally V-shaped notches 148, 150 also function as cams to cause the axial shifting of coupling member 66 on shaft 65 from one of its positions to the other thereby to reverse the direction of rotation of gear 42 and the lowest order number wheel 30 and in turn the direction of counting.

In order to reverse the direction of rotation of the number wheels and thus the direction of counting at rotational positions of the number wheels corresponding respectively to rotational positions of the input shaft 65 at the extremities of a predetermined count, such as 000°00′ and 180°00′, the arrangement now to be described is provided. A radially outwardly extending abutment 151 is formed on the highest order number wheel 38, as best seen in FIG. 8. A pair of eccentric stop members 153 and 154 are adjustably mounted on end plate 24 and are engaged by the abutment 151 in two angularly displaced predetermined rotational positions of the highest order numer wheel 38. Engagement of the abutment 151 with either one of the stops 153, 154 will arrest further rotational movement of the highest order number wheel 38 in the respective direction. Since the highest order number wheel 38 is connected by means of the transfer mechanisms to the lowest order number wheel 30, it will be seen that the arresting of further rotational movement of the highest order number wheel 38 will result in arresting of the lowest order number wheel 30, gear 42, and the two gear trains connected thereto, namely, gears 78, 80, 82 and 74 on the one hand, and 78 and 70 on the other hand, thus in turn arresting further rotational movement of the driven members 68 and 72 on the input shaft 65.

It will now be understood that when the counter is operated in an adding direction from 000°00′ toward 180°00′ when the number wheels are advanced to display a reading of 100°00′ abutment 151 on the highest order number wheel 38 will move into a position immediately adjacent stop 153. Thus, when the number wheels have further advanced to a count of 179°59′, further rotation of input shaft 65 in the same direction tending to advance number wheel 30 from a reading of 9 to a reading of 0 tends to advance number wheels 36, 34, and 32 respectively toward readings of 800, in turn causing two-tooth segment 49 on segmental gear 45 attached to number wheel 36 to tend to advance number wheel 38. Advance of number wheel 38 is however restrained by engagement of abutment 151 with stop 153 thus providing the above-described arresting of all of the number wheels, transfer mechanisms, gear trains, and the driven members 68 and 72.

In like manner, when the counter is subtracting, i.e., counting down from 180°00′ toward 000°00′ when the reading 080°00′ has been reached, advance of number wheel 30 from the reading of 0 to a reading of 9 will advance number wheels 36, 34 and 32 to readings of 795 respectively and in turn advance number wheel 38 to display the first "zero" 67. This advance of the highest order number wheel 38 to display the first "zero" 67 moves the abutment 151 into a position immediately adjacent stop 154. Thus, when the reading 000°00′ has been reached, further rotation of input shaft 65 in the same direction tending to advance the lowest order number wheel 30 to a reading of 9 tends to advance all of the number wheels, however, advance of the highest order number wheel 38 is again restrained by engagement of abutment 151 with stop 154, thus again resulting in the arresting of all of the number wheels, transfer mechanisms, gear trains and the driven members 68 and 72.

As will be hereinafter more fully described, in the illustrated embodiment the driven members 68 and 72 are phased or oriented so that the notches 148 and 150 are in proper alignment to permit shifting of coupling member 66 when counts of 179°59′ and 000°00′ are respectively displayed. As above described, continued rotation of input shaft 65 in the direction 86 beyond the position in which the digits 179°59′ are displayed results in engagement of abutment 151 with stop 154 thus arresting both of the driven members 68 and 72. However, it will be recalled that coupling member 66 is rotated with shaft 65 and thus will continue to rotate in the direction shown by the arrow 86. This continued rotation of coupling member 66 causes the projection 146 to exert a camming force on the notch 148 of the driven member 68 thus causing coupling member 66 to move axially toward coupling member 72 so that projection 144 moves into engagement with notch 150.

The above-described engagement of abutment 151 with stop 154 merely arrests the number wheels against further rotation in the direction 90; they are not restrained against rotation in the opposite direction 96. With coupling member now shifted to the position with its projection 144 engaging notch 150 in driven member 72, the number wheels will now be driven in the opposite direction as shown by the arrow 96 with the direction of input shaft rotation 86, however, remaining the same.

In like manner, when the counter has subtracted to display a reading of 000°00′, further rotation of the input shaft 65 in the direction 86 will result in engagement of abutment 151 of the highest order number wheel 38 with the stop 153, thus arresting of all of the number wheels and the driven members 68 and 72, and shifting of the coupling member 66 from the position in which projection 144 drivingly engages notch 150 of driven member 72 to the position shown in the drawings in which projection 146 drivingly engages notch 148, again to cause reversal of the direction of rotation of the number wheels.

It will be readily understood that a sudden impact is involved whenever the two-tooth gear segment of a transfer mechanism engages the respective transfer pinion, the magnitude of this impact being proportional to the speed of the transfer. It will also be understood that successively higher order transfers require proportionately greater driving torque on the gear 42 which drives the lowest order number wheel 30. It will further be observed that due to the fact that driven members 68 and 72 rotate in opposite directions but at the same rotational speed, the notches 148 and 150 will be aligned to permit shifting of the coupling member 66 twice each revolution of the lowest order number wheel 30. However, shifting of the coupling member 66 from one position to the other is desired only at the two extremities of the count, i.e., at readings of 000°00′ and 179°59′. Since the coupling member 66 is freely movable axially on the shaft 65 by virtue of the above described linear ball bearing arrangement, the impact or shock involved in higher order transfers with high speed inputs will tend to provide inadvertent shifting of the coupling member 66 at counts other than the desired extremities. For this reason, the arrangement now to be described is provided for preventing shifting of the coupling member 66 except at the two extremities of the count, i.e., 000°00′ and 179°59′ in the illustrated embodiment.

Coupling member 66 has a pair of axially spaced annular locking discs 156 and 158 formed thereon. Each of the discs 156, 158 has a notch 160 formed in its periphery, the notches 160 being in axial alignment with the projections 144 and 146, as best seen in FIG. 5. Coupling member 66 has a pair of gears 162 and 164 formed thereon respectively adjacent projections 146 and 144. A pair of locking members 166 and 168 are provided rotatably mounted on shaft 84. Locking member 166 has an elongated gear 170 formed thereon which meshes with gear 162 on coupling member 66 and is rotatably driven thereby. Locking member 168 has an elongated gear 172 formed thereon which meshes with gear 164 on coupling member 66 and is rotatably driven thereby. Locking members 166, 168 respectively have annular locking discs 174 and 176 formed thereon. Each of the locking discs 174 and 176 has a flattened portion 178 formed on one peripheral edge thereof from which a tooth 180 projects.

Another locking disc 184 is provided secured to shaft 186. Shaft 186 is journaled in the upstanding arms 188, 200 of bracket 202 which is secured to base 22. Another elongated gear 204 is secured to shaft 186 and meshes with gear 164 on coupling member 66. Locking disc 184 has a flat 206 formed on one side thereof, as best seen in FIGS. 11 and 12.

The gear ratios of gears 162 and 170, 164 and 172, and 164 and 204 are different and are chosen so that the teeth 180 of locking discs 174, 176 are in axial alignment with the notches 160 of locking discs 156, 158 of the coupling member 66, and flat 206 of locking disc 184 is positioned so disc 184 does not interfere with disc 158 only adjacent the extremities of the count, i.e., 000°00′ and 179°59′. Thus, referring to FIGS. 5 and 11, at rotational positions of the counter other than adjacent the two extremities of the count, locking discs 156 and 158 on coupling member 66 are respectively disposed on one side of locking discs 174 and 176 and locking disc 158 is also disposed on one side of locking disc 184. At all rotational positions of the counter other than adjacent the two extremities of the desired count, by virtue of the differential between the gear ratios of gears 162 and 170, gears 164 and 168, and gears 164 and 204, at least one of the complementary pairs of locking discs 156 and 174, 158 and 176, and 158 and 184 will interfere thereby preventing shifting of the coupling member 66 from one of its positions to the other, as best seen in FIG. 11. At the two extremities of the count, however, i.e., 000°00′ and 179°59′, the teeth 180 of locking discs 174, 176 are respectively in axial alignment with the notches 160 of locking discs 156, 158 and flat 206 of locking disc 184 is disposed so disc 184 does not interfere with disc 158, as best seen in FIG. 12, thus releasing the restraint against shifting on the coupling member 66 and permitting the coupling member 66 to be shifted freely, as above described, from one position to the other. In the illustrated embodiment, gear 162 is provided with 26 teeth, gear 170 is provided with 27 teeth, gear 164 is provided with 39 teeth, gear 172 is provided with 40 teeth, and gear 204 is provided with 15 teeth.

As indicated hereinbefore, it is essential that a reversing counter not lose count cumulatively with continuous input shaft rotation in the same direction. In the illustrated embodiment, with the lowest order number wheel 30 bearing digits from 0 to 9 thereon, 36° of input shaft rotation is required to advance the count by one digit. It will be observed that a finite amount of input shaft rotation is required to shift the coupling member 66 from one of its positions to the other, and that during this period of shifting both of the driven members 68, 72 are restrained so that it would appear that the amount of input shaft rotation required to effect shifting of the coupling member has been lost in the process of shifting. This apparent lost count can however be compensated for during one complete cycle of the counter by arranging the device so that the shifting operation takes place during 36 degrees of input shaft rotation corresponding to one digit next following the lowest reading of the counter, i.e., 000°00′ on the one hand, and during the 36° of input shaft rotation next following the next-to-highest reading, i.e., 179°59′. In addition to the foregoing, it will be understood that the transfer mechanisms and gear trains connected between the driven members 68, 72 and the highest order number wheel 38 inherently have backlash and thus, after the abutment 151 has been caused to engage one or the other of the stops 153, 154, a finite amount of additional input shaft rotation will inherently take place while the backlash is being picked up before the driven members 68, 72 are finally arrested; this backlash typically will be on the order of 3 to 5° of input shaft rotation but may be as high as 7 or 8°. As indicated, it is essential that the notches 148, 150 in the driven members 68, 72, be properly aligned to permit shifting of the coupling member 66 and to provide such alignment at the proper instant requires an allowance for the backlash.

In accordance with the invention, the apparent loss of count due to the amount of input shaft rotation required to shift the coupling member 66 from one position to the other is compensated for and the coupling members 68, 72 are properly oriented to permit shifting of the coupling member 66 at the proper instants by proportioning the cam surfaces of the projections 144, 146 and the notches 150, 148, and adjusting the stops 153, 154 so that reversal of the lowest order number wheel is accomplished in Z degrees of input shaft rotation and responds to the expression $2X+Y=Z$ where Z is the incremental rotational movement of the input shaft in degrees to advance the lowest order number wheel by one digit, Y is the degrees of rotation of the input shaft required to shift the coupling member 66 from one position to the other, and X is degrees of total rotational overtravel of the input shaft beyond rotational positions thereof corresponding to the lowest counter reading, i.e., 000°00′, and the next-to-highest reading, i.e., 179°59′, before the driven members 68, 72, are restrained; $X=A+B$ where B is the cumulative backlash of the counter in degrees and A is the degrees difference between X and B. In the illustrated embodiment where the lowest order number wheel has digits from 0 to 9 thereon, Z is 36° and Y has been chosen to be 18° thus making $X=9°$. Assuming that the backlash B in a particular counter is 3°, the overtravel A of the input shaft 65 beyond the extremities of the count, i.e., 000°00′ and 179°59′ before the abutment 151 engages the respective stop 153, 154 will be 6°.

Thus, in the illustrated embodiment, starting with a count of 179°58′ the next 36° rotation of input shaft 65 will advance the count to 179°59′ and 6 additional degrees of input shaft rotation will advance the highest order number wheel 38 until the abutment 151 engages stop 154 thereby arresting the highest order number wheel. The next three degrees of rotation of the input shaft will take up the backlash and the coupling member 66 will be shifted during the next successive 18° of rotation. Finally, the next 9° of rotation of input shaft following shifting of the coupling member 66 will return the lowest order number wheel to its position before the reversal is initiated, i.e., displaying the digit 9 so that the reading remains 179°59′, it being observed that a count of one digit has been lost in the reversal since a total of 36° of input shaft rotation has been required to effect the reversal. This loss of the count of one digit in reversing the direction of rotation of the counter at the upper extremity of the count is however compensated for at the lower extremity, as indicated in the chart below.

| Counter presentation | Input shaft rotation, degrees | Reversing action | Input shaft position | Error |
|---|---|---|---|---|
| E17958 | | | E17958 | None. |
| E17959 | | | E17959 | Do. |
| E17959+¼ } | 9 | | {E17959+¼ | |
| W17959+¼ } | 18 → | Stop shift | {E17959+¾ | ½ |
| W17959 | 9 | | 18000 | 1. |
| W17958 | | | W17959 | 1. |
| ↓ | | | ↓ | |
| W00001 | | | W00002 | 1. |
| W00000 | | | W00001 | 1. |
| W00000−¼ } | 9 | | {W00000+¾ | 1. |
| E00000−¼ } | 18 → | Stop shift | {W00000+¼ | ½. |
| E00000 | 9 | | 00000 | None. |
| E00001 | | | E00001 | Do. |
| ↓ | | | ↓ | |
| E17958 | | | E17958 | Do. |
| E17959 | | | E17959 | Do. |
| E17959+¼ } | 9 | | {E17959+¼ | |
| W17959+¼ } | 18 → | Stop shift | {E17959+¾ | ½. |
| W17959 | 9 | | 18000 | 1. |
| W17958 | | | W17959 | 1. |
| ↓ | | | ↓ | |

Figure 16:
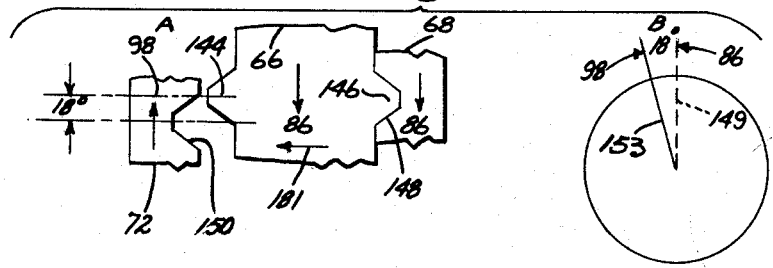
FIGS. 16, 17, 18 and 19 are schematic illustrations showing angular relations of the coupling member and driven members useful in explaining the operation of the invention.
Figure 17:
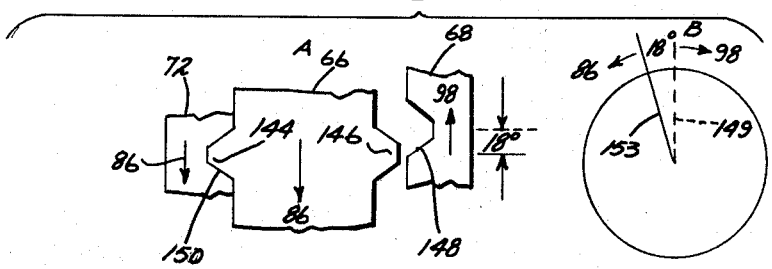

As will be seen in the foregoing chart, the notches 148 and 150 in the driven members 68 and 72 respectively must be properly aligned to permit shifting of the coupling member 66 from one position to the other at rotational positions of the input shaft 65, 9° ahead of the 000°00' reading and 9° after the 179°59' reading; recalling that in the illustrated embodiment 18° of input shaft rotation is required to shift the coupling member 66 from one position to the other, it will be understood that the notches 148 and 150 are properly aligned to permit shifting of the coupling member when they are angularly displaced by 18°. Referring now to FIG. 16(A), the coupling member 66 and the driven members 68 and 72 are shown in their relative positions at the instant of shifting at the lower extremity of the count, i.e., 9° of input shaft rotation beyond 000°00'. Here, with the coupling member 66 and the input shaft 65 rotating in the direction shown by the arrow 86 and with projection 146 engaged with notch 148 of coupling member 68, just prior to arresting of the driven members, driven member 68 has been rotated in the direction shown by the arrow 86 and driven member 72 has been rotated in the direction shown by the arrow 98 to the position shown in FIG. 16(B) wherein the rotational position of the notch 148 is shown by the dashed line 149 and the rotational position of the notch 150 is shown by the solid line 153. Adjustable stop 153 is adjusted so as to arrest both driven members 68 and 72 with an 18° angular displacement between notches 148 and 150, as shown. Continued rotation of the input shaft and the coupling member 66 in the direction shown by the arrow 86 causes the coupling member to shift axially in the direction shown by the arrow 181. With the thus arrested driven members 68 and 72 oriented so that notch 150 is angularly displaced from notch 148 by 18° in the direction of arrow 86, and with the coupling member 66 rotating 18° in that direction as it shifts, it will be seen that notch 150 of coupling member 72 is properly oriented to receive projection 144 at the completion of 18° of input shaft rotation, as shown in FIG. 17(A). At this instant, the direction of rotation of the coupling members 68, 72 is reversed with coupling member 68 now beginning to rotate in direction 98 and coupling member 72 beginning to rotate in direction 86, as shown in FIG. 17(B).

Figure 18:
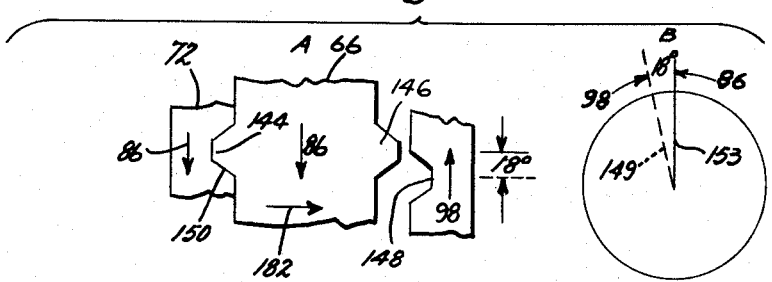
Figure 19:
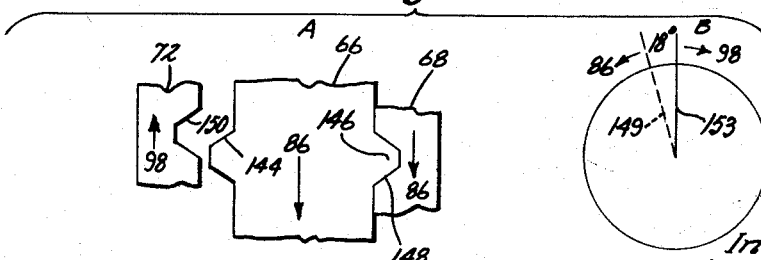

It will be recalled that each of the driven members 68, 72 rotate at the same speed as the input shaft 65 and the lowest order number wheel 30, the respective driven member which is engaged by the coupling member rotating in the same direction as the input shaft and the disengaged driven member rotating in the opposite direction. This being the case, the driven members 68, 72 will return to their original orientations as shown in FIG. 16(A) and (B) each full revolution of the input shaft and lowest order number wheel 30. However, the shifting of the coupling member 66 at the upper extremity of the count is not initiated at the conclusion of a corresponding number of full revolutions of the input shaft, which would be 9° of input shaft rotation less than 180°00' but on the contrary is initiated 9° of input shaft rotation after 179°59' or 18° short of a full revolution of the input shaft and the lowest order number wheel; if the count was allowed to proceed to 9° short of 180°00' the notches 148 and 150 would be restored to their positions shown in FIG. 16(A) and (B). Thus, at a reading of 9° of input shaft rotation beyond 179°59' the notches 148 and 150 have respectively advanced to positions 18° less than a full revolution from their initial positions, as shown in FIG. 18(A) and (B); it will be observed that notch 148 is now displaced from notch 150 by 18° in the direction of the arrow 86, i.e., the direction of rotation of the input shaft 65 and the coupling member 66. Adjustable stop 154 has been adjusted so that the driven members 68, 72 are arrested at this point thus causing the coupling member 66 to shift axially as shown by the arrow 182. It will now be observed that at this point the notch 148 is again properly positioned to receive projection 146 on the coupling member 66 as it is shifted axially in the direction 182 and rotated by 18° in the direction shown by the arrow 86. At the conclusion of the shifting operation, coupling member 66 engages driven member 68 again starting to drive the same in the direction 86 and the driven member 72 now again begins to rotate in the direction 98, as shown in FIG. 19(A) and (B).

It will now be seen that there is provided in accordance with the invention a counter which will automatically reverse the direction of counting at extremities of a predetermined count with continuous input shaft rotation and without a cumulative loss of count, the loss of one digit in the count in the shift at the upper extremity being compensated for in the shift at the lower extremity. It will be seen further that reversal of the direction of counting is accomplished with very low torque by virtue of the linear ballbearing mounting of the coupling member, and that inadvertent reversal is pervetned by the above-described locking arrangement without detents or drag springs; operation of the counter at high input shaft speeds is thus permitted since the shocks accompanying transfers do not tend to cause inadvertent reversal.

While the invention is shown as being embodied in a longitude counter, it is equally applicable to latitude or deviation counters. In the case of a latitude counter presenting degrees and minutes, the maximum required presentation is 90°00' and thus only four number wheels are required. Further, the counter is required to reverse only at the Equator, i.e., 00°00' reversal of the direction of counting at the poles commonly being accomplished by reversal of the direction of rotation of the input shaft in the navigational computer. With this arrangement therefore, the reversal mechanism is required to be operated only at the 00°00' presentation and thus only one adjustable stop is required.

While there is illustrated and described a specific embodiment of the invention, further modifications and improvements will occur to those skilled in the art and it is desired therefore in the appended claims to cover all modifications which do not depart from the spirit and scope of the invention.

What is claimed is:

1. An automatically reversing revolution counter comprising: a plurality of successively higher order number wheels with intermittent motion transferring means respectively interconnecting said wheels; a rotatable input shaft; first and second driven members rotatably mounted on said shaft in axially spaced-apart relation; a coupling member mounted on said shaft between said driven members and rotatable with said shaft, said coupling member being axially movable on said shaft between first and second positions, the opposite ends of said coupling member and the respective ends of said first and second driven members respectively having cooperating driving means thereon, said coupling member in said first position thereof having the driving means at one end cooperatively engaging the driving means of said first driven member thereby normally rotating the same in unison with said shaft, said coupling member in said second position thereof having the driving means at its other end cooperatively engaging the driving means of said second driven member thereby normally rotating the same in unison with said shaft; means respectively coupling said first and second driven members to the lowest order one of said number wheels for rotating the same in one direction when said first driven member is rotated in a given direction by said coupling member and in the opposite direction when said driven member is rotated in said given direction by said coupling member; and means for arresting further rotational movement of the highest order one of said number wheels at at least one predetermined angular position thereof thereby arresting further rotational movement in the same direction of all of said number wheels, said coupling means and said driven members; said driving means respectively having cooperating cam surfaces thereon, said cam surfaces cooperating to shift said coupling member on said shaft from one position to the other responsive to arresting of the respective driven member and continued rotation of said coupling member and input shaft in the same direction thereby reversing the direction of rotation of said lowest order number wheel.

2. The apparatus of claim 1 wherein said driving means comprises a generally V-shaped projection on each end of said coupling member and a cooperating generally V-shaped notch formed in each of said driven members, the sides of said projections and the sides of said notches respectively forming said cam surfaces.

3. The apparatus of claim 1, wherein said arresting means arrests said highest order number wheel at two predetermined angularly spaced positions thereof, wherein said number wheels respectively have digits thereon, and wherein said reversing of said lowest order number wheel is accomplished in Z degrees of input shaft rotation and responds to the expression $2X+Y=Z$ where Z is the number of degrees of input shaft rotation required to advance said lowest order number wheel by one digit and X is a predetermined number of degrees of input shaft rotational overtravel beyond two rotational positions thereof corresponding to the respective extremities of a predetermined count, where $X=A+B$ with B being the cumulative degrees of backlash in said transferring and coupling means and A being the difference in degrees between X and B, said arresting means being respectively positioned to arrest said highest order number wheel at said two angular spaced positions thereof corresponding respectively to A degrees of input shaft rotation beyond said two rotational positions of said input shaft whereby said driven members are arrested at rotational positions corresponding respectively to X degrees, and where Y is the degrees of input shaft rotation required to cause said coupling member to shift from one of its positions to the other, said cam surfaces being respectively proportioned to provide a predetermined Y degrees.

4. The apparatus of claim 3 wherein said lowest order number wheel has digits from 0 to 9 thereon with Z being 36° and Y being approximately 18°.

5. The apparatus of claim 3 wherein said driven members are rotationally related so that said driving means respectively thereon are positioned to permit said shifting of said coupling member at X degrees.

6. The apparatus of claim 3 wherein said arresting means comprises an abutment on said highest order number wheel and a pair of stop members respectively disposed to be engaged by said abutment at said two rotational positions of said highest order number wheel.

7. The apparatus of claim 3 wherein said arresting means comprises an abutment on said highest order number wheel and a pair of adjustable stop members respectively disposed to be engaged by said abutment at said two rotational positions of said highest order number wheel.

8. The apparatus of claim 3 wherein said number wheels respectively have digits thereon, wherein at one said extremity of said predetermined count said wheels display the digits of the lowest possible count, and wherein at the other said extremity said wheels display the digits of a count one digit less than the highest possible count.

9. The apparatus of claim 1 further comprising timing means coupled to said shaft and continuously driven thereby for normally restraining said coupling member against shifting from one position to the other and for releasing said coupling member to permit said shifting thereof only when said highest order number wheel is in said predetermined position.

10. The apparatus of claim 9 wherein said restraining and releasing means comprises gear means driven by said coupling member.

11. The apparatus of claim 9 wherein said restraining and releasing means comprises first and second axially spaced gears on said coupling member and rotatable therewith, first and second axially spaced annular locking discs on said coupling member between said gears and rotatable therewith, a second shaft parallel with said input shaft, first and second locking members respectively rotatably mounted on said second shaft, said locking members respectively having third and fourth gears respectively meshing with said first and second gears thereby respectively driving said first and second locking members from said coupling member, said locking members respectively having third and fourth annular locking discs thereon and rotatable therewith, a third shaft parallel with said input shaft, a fifth locking disc on said second shaft, a fifth gear secured to said fifth locking disc and meshing with one of said first and second gears, said first and second locking discs being respectively disposed on first sides of said third, fourth, and fifth locking discs when said coupling member is in one position thereof and cooperating normally to restrain shifting of said coupling member to its other position, said first and second locking discs being respectively disposed on the other sides of said third, fourth and fifth locking discs when said coupling member is in its other position and cooperating normally to restrain shifting of said coupling member to said one position, said locking discs respectively having cooperating releasing portions formed on their peripheries which permit shifting of said coupling member from one position to the other when said locking discs are in predetermined rotational positions, said first and third gears and said second, fourth, and fifth gears being proportioned so that said locking discs are in said predetermined rotational positions only when said highest order number wheel is in said predetermined position.

12. The apparatus of claim 1 wherein said coupling means comprises another shaft, gearing connecting said other shaft to said lowest order number wheel for driving the same, each of said driven members having a gear thereon, a first gear on said other shaft meshing with the gear of one of said driven members, a second gear on said other shaft, and an idler gear meshing with said second gear and the gear on the other of said driven members.

13. An automatically reversing revolution counter comprising: a plurality of successively higher order number wheels with intermittent motion transferring means respectively interconnecting said wheels; a rotatable input shaft; first and second driven members rotatably mounted on said shaft in axially spaced-apart relation; a coupling member mounted on said shaft between said driven members and rotatable with said shaft, said coupling member being axially movable on said shaft between first and second positions, said coupling member having a single generally V-shaped projection formed at each end thereof, said projections being in axial alignment, each of said driven members having a single generally V-shaped notch formed in its end facing said coupling member, the sides of said projections and the sides of said notches respectively forming cooperating cam surfaces, said coupling member in said first position thereof having the projection at one end thereof cooperatively engaging the notch of said first driven member thereby normally rotating the same in unison with said shaft, said coupling member in said second position thereof having the projection at its other end cooperatively engaging the notch of said second driven member thereby normally rotating the same in unison with said shaft; gearing respectively connecting said first and second driven members to the lowest order one of said number wheels for rotating the same in one direction when said first driven member is rotated in a given direction by said coupling member and in the opposite direction when said second driven member is rotated in said given directon by said coupling member; an abutment on the highest order one of said number wheels; two stop members respectively disposed to be engaged by said abutment at two predetermined angularly spaced positions of said highest order number wheel thereby arresting further rotational movement in the same direction of all of said number wheels, said gearing and said driven members, said cam surfaces of said projections and notches respectively cooperating to shift said coupling member on said shaft from one position to the other responsive to arresting of the respective driven member and continued rotation of said coupling member and input shaft in the same direction thereby reversing the direction of rotation of said lowest order number wheel; said gearing being proportioned and said driven members being rotationally related so that said notches are in proper alignment to permit said shifting of said coupling member from one position to the other when said highest order number wheel is in said predetermined positions; means on said coupling member having a locking portion; rotatable locking means having a locking portion, said locking portions cooperating normally to restrain said coupling member from shifting from one position to the other; and other gearing rotatably driving said locking means from said coupling member, said other gearing and said locking portions being proportioned to release said coupling member thereby to permit said shifting thereof only when said highest order number wheel is in said predetermined positions.

14. The apparatus of claim 13 wherein said lowest order number wheel has digits from 0 to 9 thereon and wherein said reversing of said lowest order number wheel is accomplished in 36° of rotation of said input shaft and responds to the expression $2X+Y=36°$ where X is a predetermined number of degrees of input shaft rotational overtravel beyond two rotational positions thereof corresponding to the respective extremities of a predetermined count, where $X=A+B$ with B being the cumulative degrees of backlash in said transferring means and gearing and A being the difference in degrees between X and B, said stops being respectively positioned to be engaged by said abutment at said two angularly spaced positions of said highest order number wheel corresponding to A degrees of input shaft rotation beyond said two rotational positions of said input whereby said driven members are arrested at rotational positions corresponding respectively to X degrees, and where Y is the degrees of input shaft rotation required to cause said coupling member to shift from one of its positions to the other, said projections and notches being proportioned to provide a predetermined Y degrees; said notches in said driven members being respectively in proper alignment at X degrees; said number wheels at said two extremities of said predetermined count being respectively positioned so that said rotation of said input shaft beyond said two rotational positions thereof causes said transferring means to tend to rotate all of said number wheels.

15. The apparatus of claim 1 wherein said number wheels are rotatably mounted on a common shaft; and further comprising a frame having a base portion and upstanding side portions, said shafts being journaled in said side portions; said arresting means comprising an abutment on said highest order number wheel and at least one stop member adjustably mounted on one of said frame side portions and disposed to be engaged by said abutment at said predetermined position of said highest order number wheel.

16. The apparatus of claim 1 wherein said number wheels are rotatably mounted on a common shaft; and further comprising a frame having a base portion and upstanding side portions, said shaft being journaled in said side portions; a presentation indicating member rotatably mounted on said common shaft between one number wheel and one frame side portion; a first lever member pivotally mounted intermediate its ends to said base portion, said first lever member having one end connected to said coupling member and movable thereby responsive to movement of said coupling member between said first and second positions thereof; and another lever member pivotally mounted intermediate its ends to said one side portion, said other lever member having one end connected to the other end of said first lever member and movable thereby, said other lever member having its other end connected to said indicating member for rotatably moving the same between first and second positions thereof responsive to movement of said coupling member between said first and second positions thereof.

17. The combination of claim 1 wherein said number wheels have digits thereon for presenting a count between predetermined extremities, wherein said cam surfaces are proportioned so that said shifting of said coupling member is accomplished in less than one incremental rotational movement of said input shaft which advances said lowest order number wheel by one digit, and wherein said arresting means are disposed so that said reversal of said lowest order number wheel is accomplished in one said incremental rotational movement of said input shaft which advances said lowest order number wheel by one digit, and wherein said arresting means are disposed so that said shifting of said coupling member is accomplished within one said incremental movement of said input shaft next following rotational positions of said shaft respectively corresponding to one of said extremities and to one digit less than the other of said extremities.

18. A revolution counter having at least three successively higher order number wheels, the lowest and second highest order number wheels having a like set of equally spaced digits of one notation thereon, the intermediate order number wheel having a predetermined number of equally spaced digits of another notation less in number of digits than on said lowest and second highest order number wheels, means for rotating said lowest order number wheel, first intermittent motion transferring means interconnecting said lowest order and intermediate number wheels and including step-up means for advancing said intermediate number wheel an angular amount corresponding to the angular spacing between one adjacent pair of digits thereon responsive to advance of said lowest order number wheel an angular amount corresponding to one notation of digits thereon, and second intermittent motion transferring means interconnecting said intermediate and next higher order number wheels and including step-down means for advancing said next higher order number wheel an angular amount corresponding to the angular spacing between one adjacent pair of digits thereon responsive to advance of said intermediate number wheel an angular amount corresponding to one notation of digits thereon.

19. The combination of claim 18 wherein said lowest and second highest order number wheels have a single notation of digits from 0 to 9 thereon and said intermediate number wheel has a single notation of digits from 0 to 5 thereon.

References Cited in the file of this patent

UNITED STATES PATENTS

| | | |
|---|---|---|
| 2,908,152 | Anderson | Oct. 13, 1959 |
| 3,022,946 | Glass et al. | Feb. 27, 1962 |
| 3,027,076 | Glass et al. | Mar. 27, 1962 |